H. E. S. HOLT.
PARACHUTE FLARE.
APPLICATION FILED FEB. 4, 1919.
1,346,454.
Patented July 13, 1920.
7 SHEETS—SHEET 3.
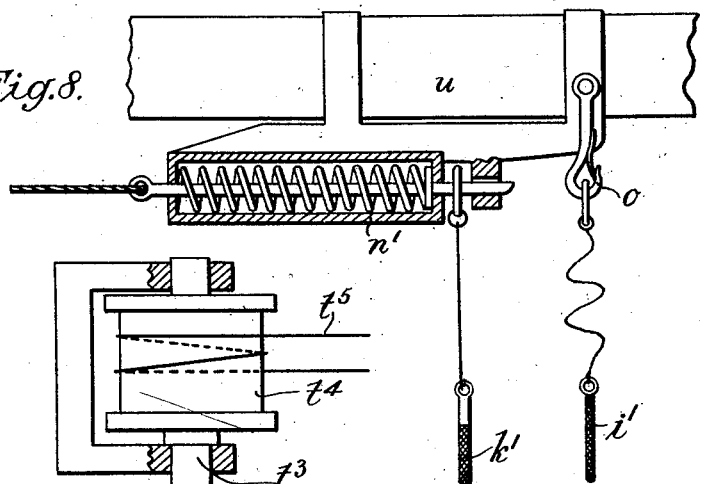
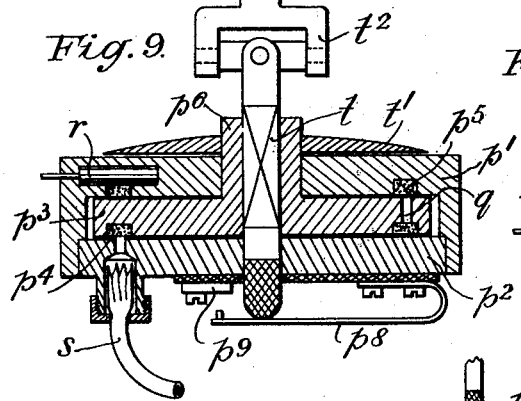
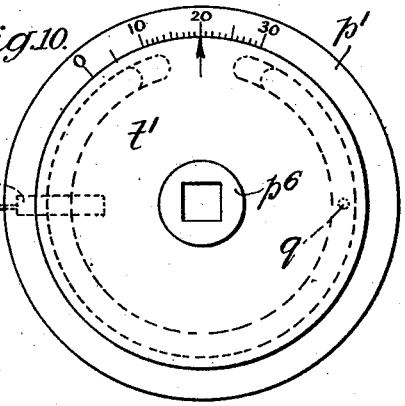
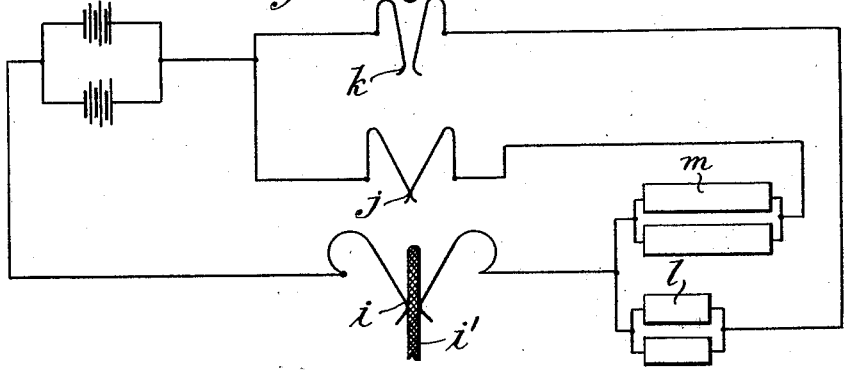

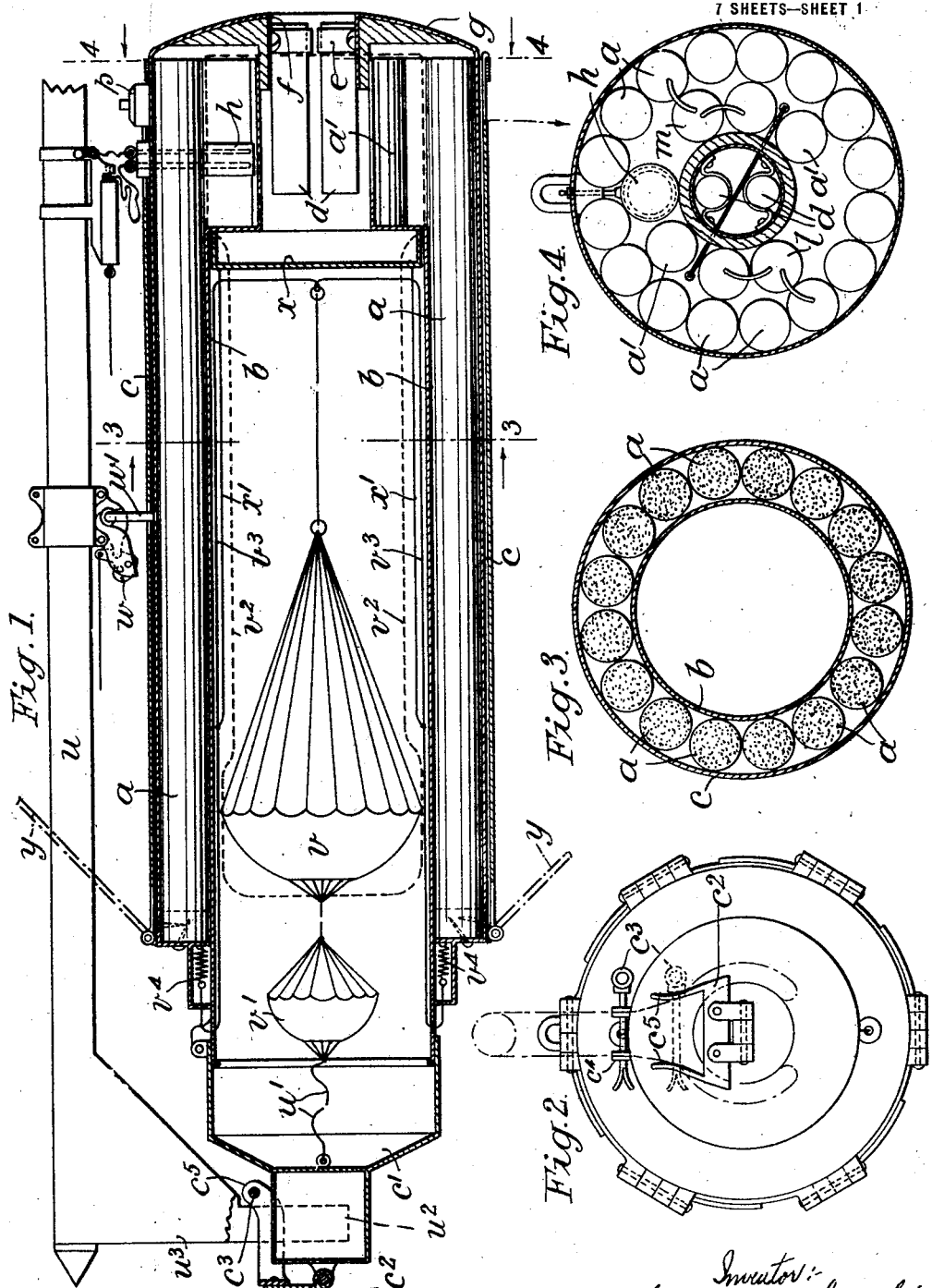

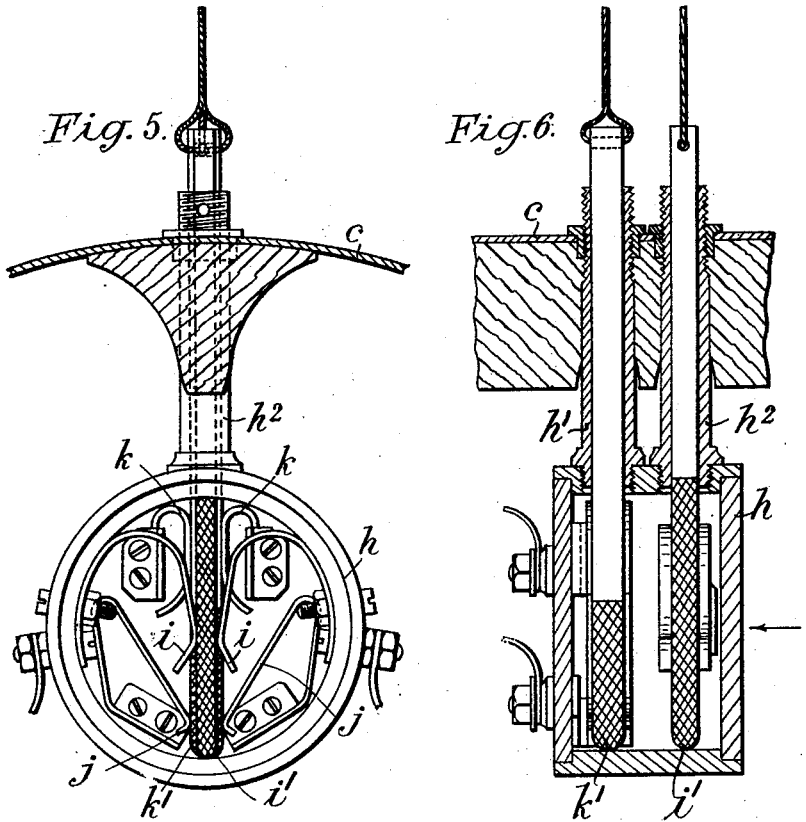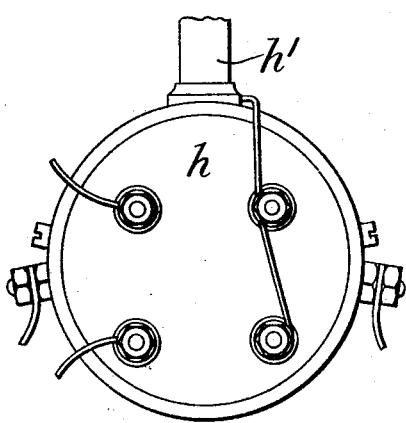

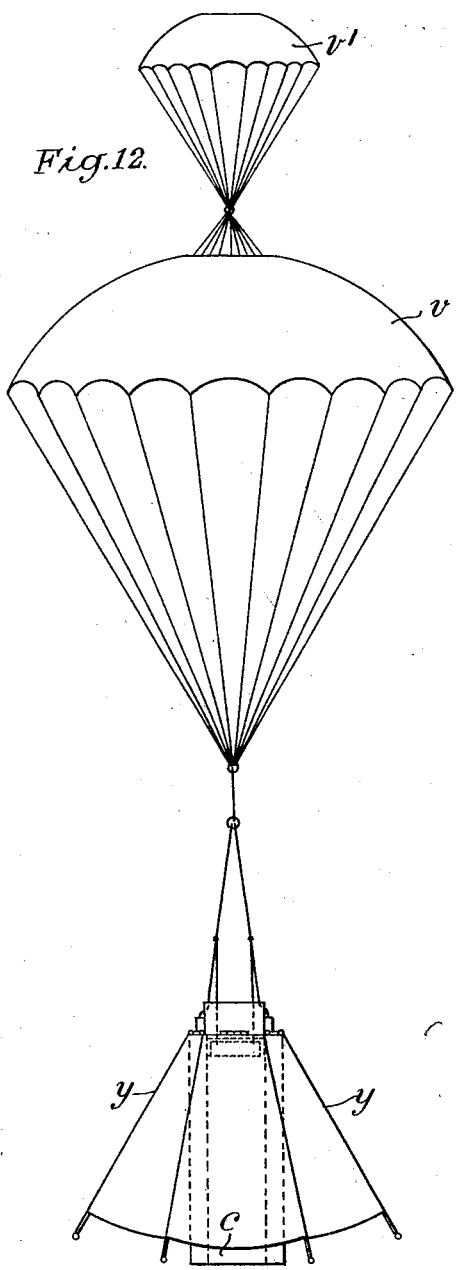

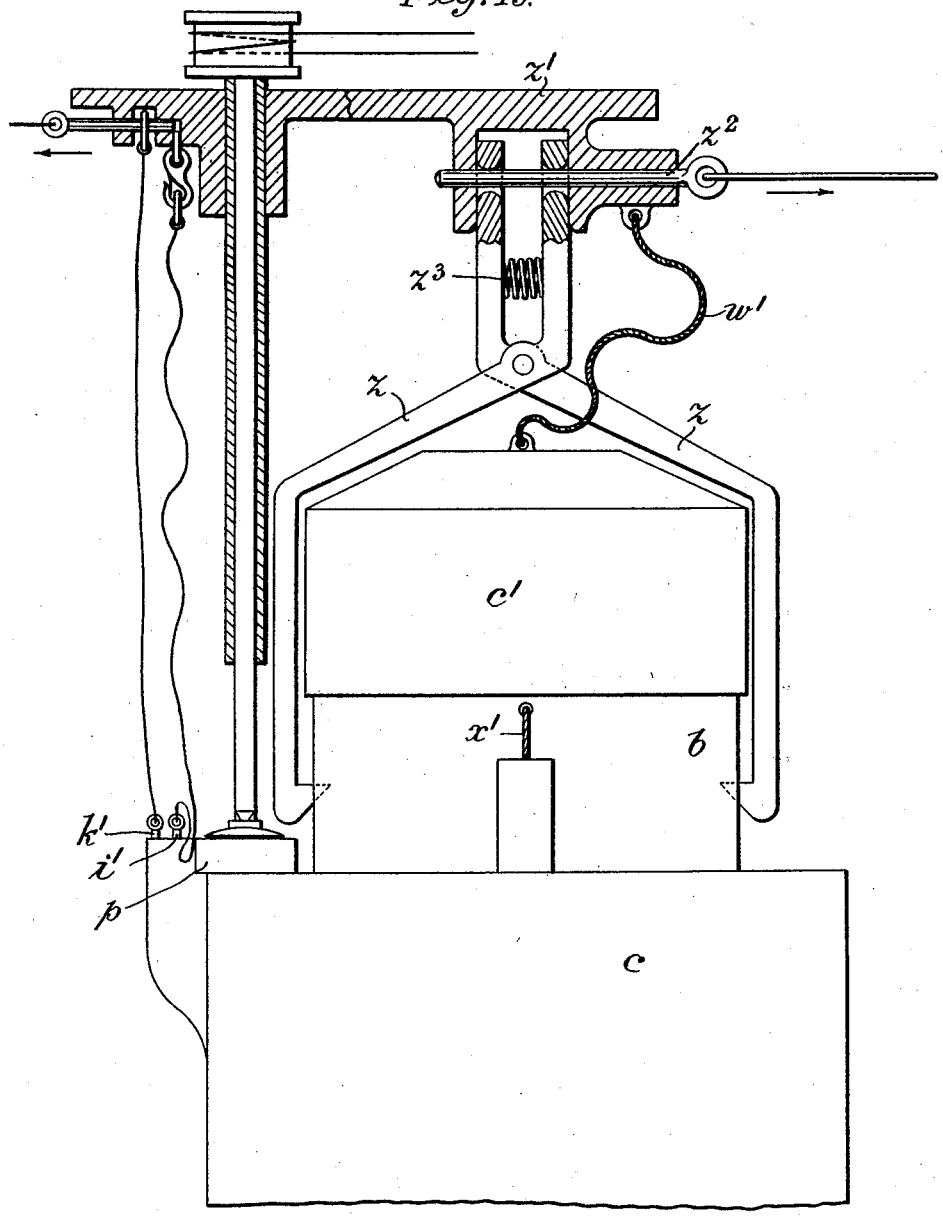

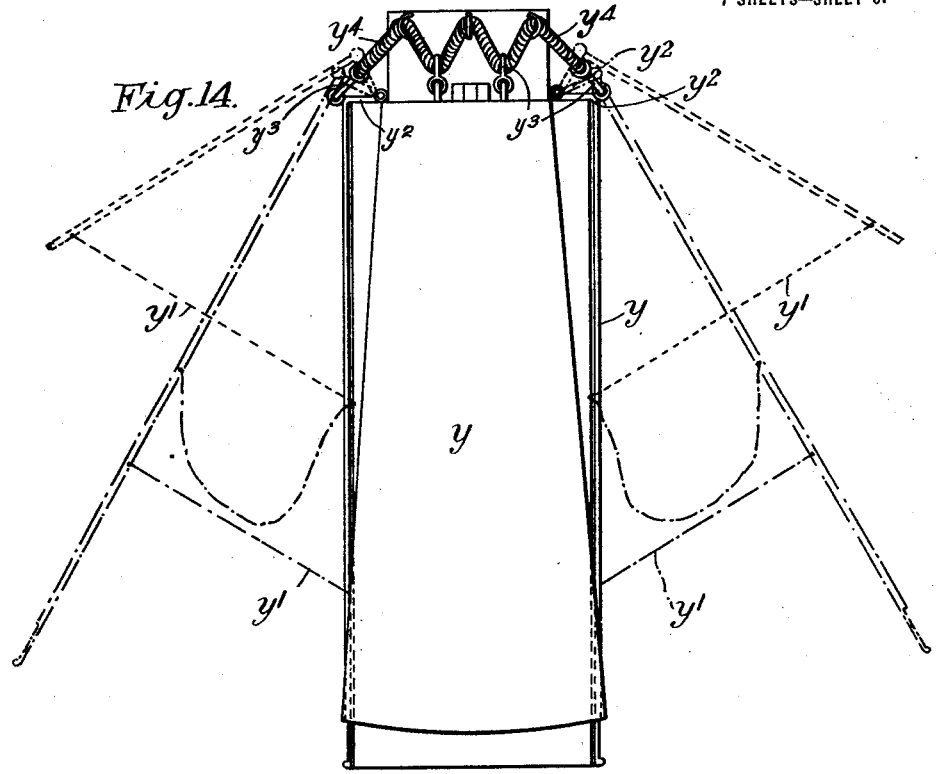
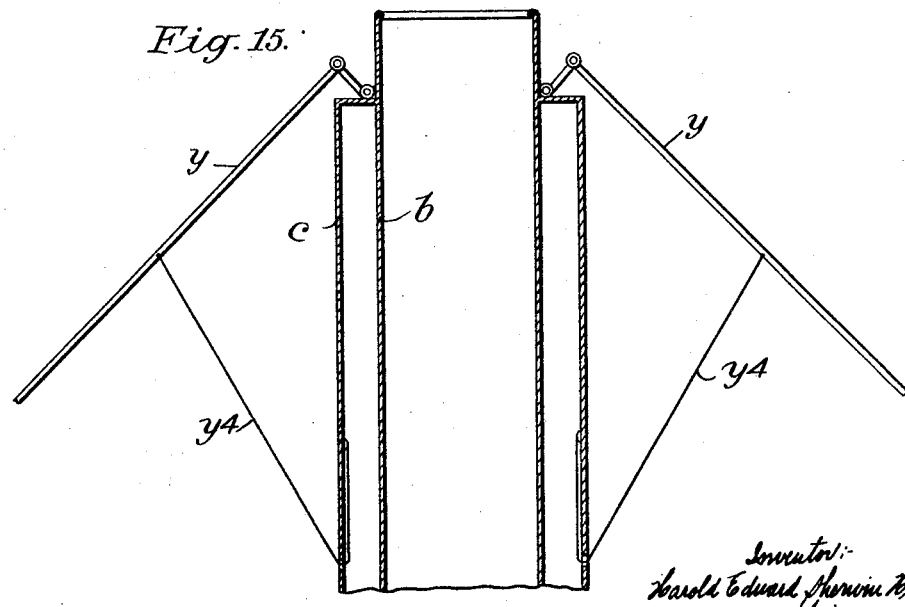

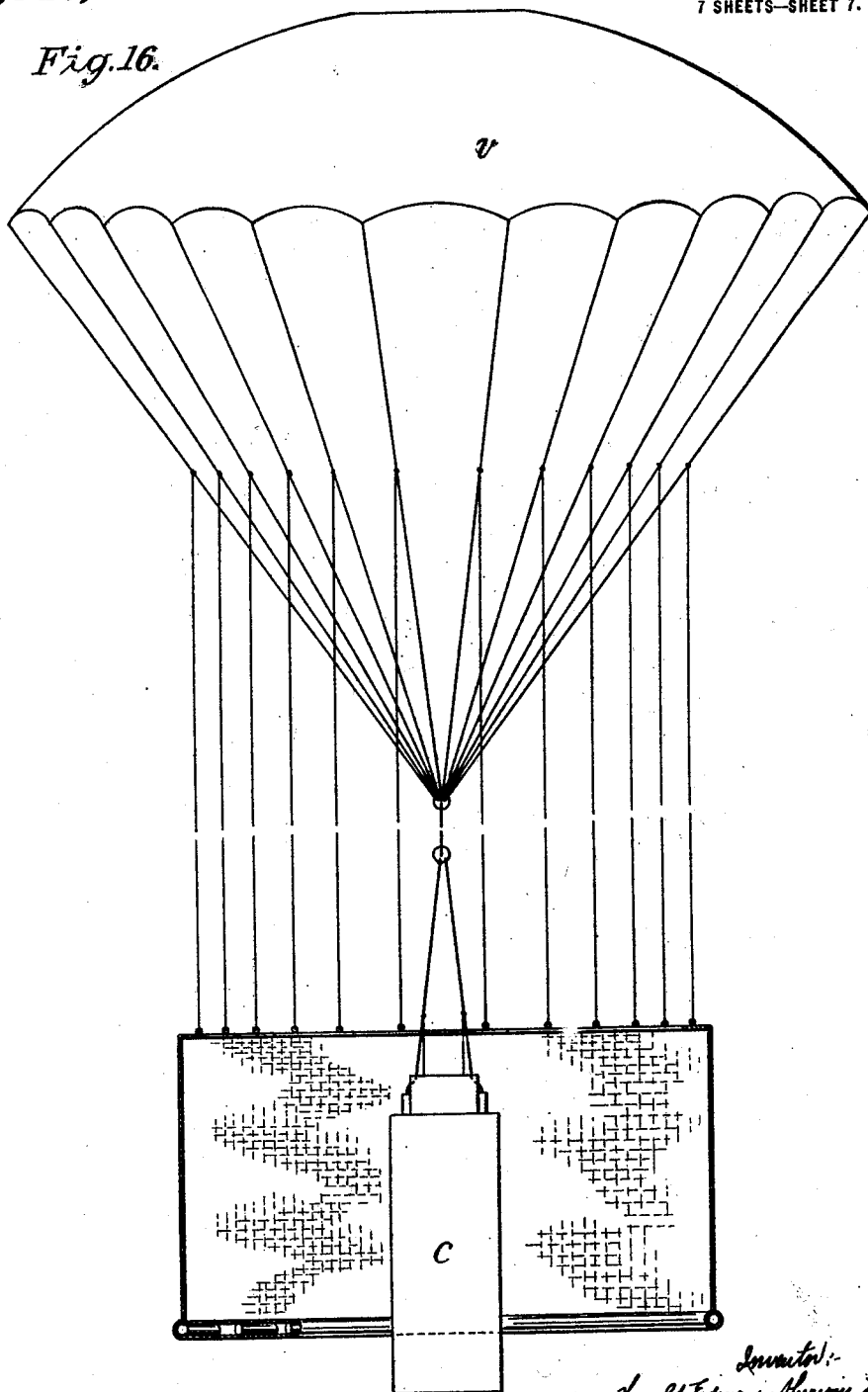

UNITED STATES PATENT OFFICE.

HAROLD EDWARD SHERWIN HOLT, OF FARNBOROUGH, ENGLAND.

PARACHUTE-FLARE.

1,346,454. Specification of Letters Patent. Patented July 13, 1920.

Application filed February 4, 1919. Serial No. 274,912.

*To all whom it may concern:*

Be it known that I, HAROLD EDWARD SHERWIN HOLT, hon. lieut. col., a subject of the King of Great Britain and Ireland, residing at The Grange, Farnborough, Hants, England, have invented certain new and useful Improvements in Parachute-Flares, of which the following is a specification.

This invention relates to parachute-flares or illuminating or smoke producing bodies (hereinafter referred to as "flare bombs") intended to be launched or released from aircraft to facilitate reconnaissance and other operations carried on at night, the parachute enabling the period of illumination to be prolonged by retarding the rate of descent, and has for its objects to provide an improved construction of flare bomb of high illuminating power, to provide safe and reliable electric ignition means therefor carried entirely by the flare bomb itself, to provide for the vertical or horizontal suspension of the flare bomb from a bomb-dropping appliance, to provide circuit breaking devices for maintaining the ignition circuit or circuits open or inoperative while the flare bomb is held in the bomb dropping appliance and previous to its suspension in said appliance, also to provide for the automatic closing of the ignition circuit or circuits upon the release of the flare bomb and for the delay of the ignition for longer or shorter periods after such release.

Where the flare bomb is released at very high altitudes and it is desired to illuminate objects on the ground, the descent should not be appreciably retarded until the flare reaches a position where its light rays can be utilized to the best advantage, and with that object the invention also includes means for keeping the main parachute inoperative for a predetermined time. Means are also provided for shading the flare in such manner as to cut off those light rays which would interfere with observation from above.

The invention is hereinafter described with reference to the accompanying drawings in which—

Figure 1 is a longitudinal section of a parachute flare bomb constructed according to this invention showing the same suspended horizontally in a cradle or holder.

Fig. 2 is an end elevation of the same.

Fig. 3 is a transverse section taken along the line 3—3 Fig. 1.

Fig. 4 is a transverse section taken along the line 4—4 Fig. 1.

Figs. 5 and 6 are transverse and longitudinal sectional detail views showing the circuit controlling switches on a larger scale.

Fig. 7 is an end elevation of the switch casing.

Fig. 8 is a detail sectional view of the switch control.

Fig. 9 is a sectional elevation of an adjustable time fuse and switch.

Fig. 10 is a plan of the time fuse.

Fig. 11 is a diagram of the electric ignition circuits.

Fig. 12 is a diagram illustrating the flare bomb with parachutes fully extended.

Fig. 13 is a sectional elevation of the upper part of a flare bomb constructed for vertical suspension.

Figs. 14 and 15 are elevation and sectional elevation respectively of a flare bomb casing illustrating the application thereto of a folding shade for intercepting upwardly directed light rays.

Fig. 16 is a diagram illustrating a flare bomb with an alternative form of shade.

As shown in Figs. 1 to 4 the flare bomb comprises a number of separate flare elements or combustible bodies $a$ disposed around an inner tube $b$ and held in position by an outer tube or casing $c$ to which the upper ends of the flares which have wood plugs fixed therein are secured by screw or other means, both the inner and outer tubes $a$, $c$ being composed of a metal such as zinc or other material which is readily burnt away by the burning of the flare material.

Any required number of flare elements or combustible bodies $a$ may be employed in the flare bomb according to the power of the light required, and additional starter flare elements $a'$ may be placed in the lower end of the flare bomb between the inner tube $b$ which is reduced in diameter at that end and the longer flare elements $a$, the short flares $a'$ being secured to the longer flares $a$ by binding wires.

In the same end of the flare bomb is placed an electric battery $d$ which supplies the current for igniting the flare elements $a$ and $a'$.

The battery cells are fixed by metal strips $e$ in a central aperture formed in a wood-lined end cover $g$ and fall away with this cover as soon as the flare bomb is ignited.

Supported in a suitable manner adjacent to the battery is a switch box $h$ of insulating material containing three sets of spring contacts $i$, $j$, $k$ shown in Figs. 5 and 6 and in the diagram Fig. 11.

In the arrangement illustrated two tubes $h'$, $h^2$ fixed to the casing $c$ support the switch box $h$ and at the same time serve as guides for two plugs $i'$, $k'$ which coöperate with the switch contacts to control the time of ignition of the flare by closing the circuit through either of two time fuses $l$, $m$ one of which delays the ignition for a longer period than the other. Plug $i'$ is made of insulating material and when inserted opens the battery circuit by separating the contacts $i$. Plug $k'$ is in part an insulator and in part a conductor. When inserted the insulating portion separates the contacts $j$ and opens the battery circuit at that point, but the other part of the plug closes the circuit at the contacts $k$. It will thus be evident that when both plugs are inserted in the switch box the circuit is open at $i$ and $j$ but closed at $k$. If plug I' be withdrawn the current will ignite the time fuse $l$ only, the circuit of the other time fuse $m$ being open at $j$ and if plug $k'$ be also withdrawn the current will ignite the time fuse $m$ only, the circuit of the time fuse $l$ being open at $k$.

It is therefore necessary to make provision for the optional withdrawal of one of the plugs and in the arrangement illustrated in Fig. 8 provision is made for releasing the plug $k'$ when desired by withdrawing with the aid of a suitable connection $n$ a spring bolt or catch $n'$ from which the plug $k'$ is suspended by a cord so that the plug is withdrawn or not according to whether it is held or released by the bolt when the bomb flare is launched. The other plug $i'$ may be suspended by a cord from a snap hook $o$ as shown. It will be seen that the plug $k'$ has a shorter suspending cord than the plug $i'$ to insure its earlier withdrawal and the cutting out of the time fuse $l$ when the time fuse $m$ is intended to operate.

In some cases an adjustable time fuse $p$ with switch shown in Figs. 9 and 10 may be employed in place of the short delay time fuse $l$, the long delay time fuse being retained to insure the ignition of the flares in the event of failure of the adjustable time fuse.

This fuse includes fixed cap and base members $p'$, $p^2$ with a disk $p^3$ mounted to rotate between them and formed with an annular groove $p^4$ containing the fuse material communicating through an aperture $q$ with a similar groove $p^5$ in the cap $p'$. An electric igniter $r$ in the battery circuit ignites the fuse which burns for a longer or shorter time according to the position of the aperture $q$ which is adjusted by turning the disk $p^3$.

A quick match $s$ connects the fuse with the flares $a$, $a'$.

For setting the fuse a square plug $t$ fits in a square hole in a boss or sleeve $p^6$ on the disk $p^3$ carrying a circular plate $t'$ with a pointer or arrow marked thereon and moving relatively to a scale on the cap member $p'$.

The plug $t$ is suspended by a universal joint $t^2$ from a spindle $t^3$ mounted to rotate in a bracket fixed to the bomb suspending cradle $u$ and carrying an operating drum $t^4$ actuated through a wire $t^5$ which is coiled around the drum and actuated by a similar drum not shown, located in a convenient position for operation and provided with a setting handle and a scale with pointer corresponding to the scale on the cap member $p'$. When the flare bomb is placed in position in the cradle the plug $t$ enters the boss $p^6$ and its lower end $p^7$ which is made of insulating material bears against a contact strip $p^8$ and separates contacts $p^9$ in the igniting circuit so that the circuit cannot be closed while the flare bomb is suspended in the cradle $u$ but only when the bomb is released from the cradle when the plug $t$ is automatically withdrawn and pemits the contacts $p^9$ to come together.

Main and auxiliary parachutes $v$, $v'$ shown diagrammatically in Fig. 1 are connected together and held in a folded condition in the tube $b$ until the flare bomb is released when the small auxiliary parachute $v'$ is at once withdrawn from the tube, by a thin cord $u'$ connected to a detachable cap $c'$ applied to the adjacent end of the tube $b$ and held in suspension after the launching of the bomb. When the small parachute is fully withdrawn the cord $u'$ is arranged to break. Meanwhile the main parachute $v$ is held in the tube for a time against the pull of the auxiliary parachute by a retaining cord $v^2$ which is carried over the main parachute $v$ or may be attached to a wooden disk interposed between the main and auxiliary parachutes $v$, $v'$.

The retaining cord $v^2$ is released by the burning of the flare allowing the main parachute to be withdrawn from the tube $b$ by the auxiliary parachute. Wire ropes $v^3$ serving to attach the main parachute to the flare bomb have spring connection $v^4$ which reduce the shock on the main parachute at the time of opening.

For suspending the flare bomb in the cradle $u$ a suspending eye $w'$ on the casing $c$ engages a slip hook $w$ which being of known construction need not be described here. The detachable cap $c'$ serves as an additional means of suspension being seated in a fork $u^2$ on the cradle and provided with a pivoted clip $c^2$ fitting over the depending portion $u^3$ of the cradle above the fork. At the time of mounting the flare bomb in the cradle the pin $c^3$ is withdrawn from hinge lugs $c^4$ in the cap $c'$ and inserted in holes $c^5$ in the pivoted clip $c^2$ to secure the clip to the cradle.

When the main parachute leaves the tube $b$ during the descent of the flare bomb, a flanged plate or shield $x$ situated in the tube below the parachute and connected by cords $x'$ to the ropes $v^3$ is pulled up to the top of the tube $c$ and closes the passage through the tube.

It is found that in some cases the burning flare bombs are not sufficiently screened or shaded from the airmen employing them with the result that at certain angles the rays have a dazzling effect which interferes with observation besides being objectionable in other respects and shading means are preferably provided for preventing the light rays being disseminated except in the direction required. Such shading means is conveniently formed of hinged folding plates or of a cylinder of fireproof fabric.

The plates $y$ are folded against the body of the flare bomb where they are secured by a tape, or the like which is released by the burning of the flare and are hinged to the top of the casing at their upper ends.

They may be arranged to spring outward when released by their own inherent resiliency or be forced open by springs.

Cords $y'$ adapted to be released as the flare bomb is consumed control the opening of the shade. In Fig. 14 two sets of cords $y'$ are shown which hold the shade at different angles to the flare bomb as the latter burns away.

One way of applying a spring for opening the shade is also shown in Fig. 14. In this case hinge members $y^2$ rigid with the plate $y$ are formed at right angles thereto are connected by links $y^3$ with a looped spring $y^4$ attached at intervals to the flare casing. It will be seen that owing to the angular disposition of the hinge members the spring is tensioned when the shade is folded.

Fig. 15 shows an alternative arrangement in which copper wires $y^{40}$ are employed to hold the plates $y$ these wires being passed through holes in the casing and attached thereto at some distance above the holes so that as the thin zinc, casing burns away the effective length of the wires is increased automatically allowing the shade to open to a corresponding degree.

The shade or screen could also be made of a fabric such as fireproofed silk coated with asbestos which could be carried on metal ribs after the manner of an umbrella. Fig. 16 illustrates a screen consisting of a cylinder of fireproof fabric weighted at the lower edge and suspended by tapes from the cords of the parachute.

Where it is desired to suspend the flare bomb vertically as shown in Fig. 13 a pair of pivotally connected levers or tongs $z$ are arranged to engage with their lower ends in holes or recesses in the upper end of the tube $b$ which projects beyond the casing $c$, and are held between lugs in a bracket $z'$ by a pin $z^2$. When the pin $z^2$ is withdrawn the levers fall out of engagement with the lugs and are forced open by a spring $z^3$ allowing the bomb flare to drop, the cap $c'$ which withdraws the small parachute being pulled off by a cord $w'$. The removable switch plugs $k'$, $i'$ of the time fuses and the adjustable fuse $p$ would in this form of suspension be arranged at the upper end of the flare bomb as shown and would be operated after the manner already described.

I claim:—

1. A flare bomb capable of being launched from aircraft comprising an inner tube and an outer tube spaced therefrom and inclosing the combustible material of the flare between them, a parachute attached to the bomb but inclosed in the inner tube when inoperative, electric ignition means carried by the flare bomb, an automatic switch arranged to close an ignition circuit upon the release of the bomb from the launching appliance and means for delaying the ignition and the opening of the parachute for longer or shorter periods after such release, substantially as described.

2. A flare bomb including a main parachute, an auxiliary parachute, means to initially hold said parachutes in folded condition, means to release the auxiliary parachute, and means controlled by the burning of the flare to release the main parachute.

3. A flare bomb for launching from an aircraft and having different time fuses each arranged in normal open circuit with an electric battery carried on the bomb, and circuit closers for the several time fuse circuits and each including a movable element, a launching apparatus, and connections between the same and said movable elements of the circuit closers to cause the said time fuse circuits to be closed one after another after the bomb is launched.

4. A flare bomb for launching from air craft including a detachable closing cap at one end thereof and means for securing the same to the launching cradle.

5. In a flare bomb for launching from aircraft a folding screen arranged to intercept upwardly directed light rays during the descent of the flare bomb substantially as described.

Dated this 21st day of September 1918.

In testimony whereof I have affixed my signature.

HAROLD EDWARD SHERWIN HOLT.